United States Patent
Hutchins et al.

(10) Patent No.: US 9,037,621 B2
(45) Date of Patent: *May 19, 2015

(54) EFFICIENT RECONSTRUCTION OF VIRTUAL DISK HIERARCHIES ACROSS STORAGE DOMAINS

(71) Applicant: VMware, Inc., Palo Alto, CA (US)

(72) Inventors: Gregory Hutchins, San Francisco, CA (US); Steven Michael Kusalo, Fremont, CA (US); Haripriya Rajagopal, Sunnyvale, CA (US); Jairam Ranganathan, Los Angeles, CA (US); Li Zheng, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,127

(22) Filed: Jul. 2, 2013

(65) Prior Publication Data

US 2013/0298125 A1 Nov. 7, 2013

Related U.S. Application Data

(63) Continuation of application No. 12/469,577, filed on May 20, 2009, now Pat. No. 8,478,801.

(51) Int. Cl.
*G06F 17/30* (2006.01)
*G06F 9/455* (2006.01)

(52) U.S. Cl.
CPC .......... *G06F 9/455* (2013.01); *G06F 17/30115* (2013.01)

(58) Field of Classification Search
USPC ...................... 707/803, 829; 711/6
See application file for complete search history.

(56) References Cited

U.S. PATENT DOCUMENTS

| | | | |
|---|---|---|---|
| 5,930,806 A | 7/1999 | Taira et al. | |
| 5,970,496 A * | 10/1999 | Katzenberger | 1/1 |
| 7,225,204 B2 | 5/2007 | Manley et al. | |
| 7,356,679 B1 | 4/2008 | Le et al. | |
| 7,484,208 B1 | 1/2009 | Nelson | |
| 8,429,360 B1 * | 4/2013 | Iyer et al. | 711/162 |
| 2003/0182325 A1 | 9/2003 | Manley et al. | |
| 2004/0243571 A1* | 12/2004 | Judd | 707/3 |
| 2006/0101041 A1* | 5/2006 | Agarwal et al. | 707/100 |
| 2008/0098154 A1 | 4/2008 | Traut et al. | |

(Continued)

OTHER PUBLICATIONS

Article entitled "Understanding and Using Microsoft Windows Server 2008 Hyper-V Snapshots", by Carbone, dated Jul. 23, 2008.*

(Continued)

*Primary Examiner* — Mahesh Dwivedi (57) ABSTRACT

A method and software is described for recreating on a target datastore a set of hierarchical files that are present on a source datastore. A content identifier (ID) is maintained for each component of the set of hierarchical files. The content ID of a component is updated when its contents are modified. The child component is copied from the source datastore to the target datastore. The content ID corresponding to the parent component on the source datastore is compared with content IDs corresponding to files present on the target datastore. When a matching content ID is discovered, it infers a copy of the parent component. The matching file on the target datastore is associated with the copied child component so that the matching file becomes a new parent component to the copied child component, thereby recreating the set of hierarchical files on the target.

15 Claims, 5 Drawing Sheets

(56) References Cited

U.S. PATENT DOCUMENTS

| | | | |
|---|---|---|---|
| 2008/0215796 A1* | 9/2008 | Lam et al. .................... 711/100 |
| 2009/0037680 A1 | 2/2009 | Colbert et al. | |
| 2009/0222691 A1 | 9/2009 | Riemers | |
| 2010/0049930 A1* | 2/2010 | Pershin et al. ................ 711/162 |
| 2010/0057759 A1 | 3/2010 | Cotichini et al. | |
| 2010/0205224 A1* | 8/2010 | Palanisamy et al. .......... 707/803 |
| 2010/0205303 A1* | 8/2010 | Chaturvedi et al. ........... 709/226 |
| 2010/0262585 A1 | 10/2010 | Rosikiewicz et al. | |
| 2010/0262586 A1 | 10/2010 | Rosikiewicz et al. | |

OTHER PUBLICATIONS

Article entitled "Workstation User's Manual," Copyright 2007, by VMware.

"VMware Infrastructure SDK Programming Guide," Revision 20060906, Version 2.0.1 Item: SDK-ENG-Q306-291.

* cited by examiner

EFFICIENT RECONSTRUCTION OF VIRTUAL DISK HIERARCHIES ACROSS STORAGE DOMAINS

CROSS REFERENCE TO RELATED APPLICATIONS

This application is a continuation of and claims the benefit of U.S. patent application Ser. No. 12/469,577, filed May 20, 2009, issued on Jul. 2, 2013 as U.S. Pat. No. 8,478,801 which is hereby incorporated by reference.

BACKGROUND

In certain computing applications, it is desirable to separately maintain a data file and changes to the data file instead of writing the changes directly to the data file. For example, one might want to have the ability to "undo" the changes and return to the original data file. Alternatively, there might be a desire to make multiple independent changes to an initial file, without having to copy the initial file for each independent change.

In the field of computer virtualization, and particularly desktop virtualization, delta disks, also referred to as "redo logs" "diff files" etc., may be used to customize a base disk image for a virtual disk. A discussion of the use of such delta disks for virtual computer systems is provided in U.S. Pat. No. 7,356,679, entitled "Computer Image Capture, Customization and Deployment," which issued on Apr. 8, 2008. Each delta disk contains changes to the base disk image to provide customization and data retention for each user. The combination of base and delta disks make up a virtual disk hierarchy virtualized by virtualization software so that it appears to each user (or virtual machine) as a single physical disk. Each virtual disk may be organized in a manner similar to conventional physical disks, i.e., into discrete addressable disk blocks. When the virtual disk is read, first the delta disk is accessed to determine if the portion of the virtual disk being accessed is contained within the delta disk. For example, if a particular disk block of the virtual disk includes modifications since creation of the delta disk, then that disk block will be present in the delta disk. If the disk block is not present in the delta disk, then the corresponding disk block is accessed in the base image, from which the requested information is retrieved. Writes to the virtual disk are directed to the delta disk. If the write is directed to a previously modified disk block present in the delta disk, then the previously modified disk block is overwritten, otherwise the delta disk is augmented to include the newly modified disk block.

In some cases, it may be desirable to have one or more chains of delta disks from a single base. In an enterprise environment, for example, there may be a base disk image for a company containing the operating system and installed software usable by each employee, such as an email client. Then from this base disk image, a plurality of departmental delta disks include software suitable for each department. Accounting software for the accounting department, computer-aided design software for the engineering department, etc. Then from each of these departmental deltas, individual deltas may be maintained by individual users.

In ordinary use of computer disk images, the data storage requirements increase over time, making it necessary at some point to move one or more disks images from one datastore to another. In the field of virtualization, sometimes it is necessary to migrate a virtual machine from one datastore to another, e.g., for load-balancing, or to take a physical computer out of service. However, where a virtual disk is made up of a base disk image and one or more deltas, each of the parent delta images and base image must be copied along with the delta, or else some logical connection must be maintained across data stores, which in some cases is not possible.

SUMMARY

A method and software recreates on a target datastore a set of hierarchical files that are present on a source datastore, the set including a parent component and a child component. A content identifier (ID) is maintained for each component of the set of hierarchical files. The content ID is updated when the contents of a corresponding one of the components are modified. In one embodiment, the child component contains changes to the parent component and is writable, whereas the parent component is read-only. The child component is copied from the source datastore to the target datastore. The content ID corresponding with the parent component on the source datastore is compared with content IDs corresponding to files present on the target datastore. When a matching content ID is discovered, a matching file is identified, the matching file being a file on the target datastore that corresponds to the matching content ID. The matching file is associated with the copied child component so that the matching file becomes a new parent component to the copied child component, thereby recreating the set of hierarchical files on the target datastore using the matching file.

DETAILED DESCRIPTION

Figure 1:
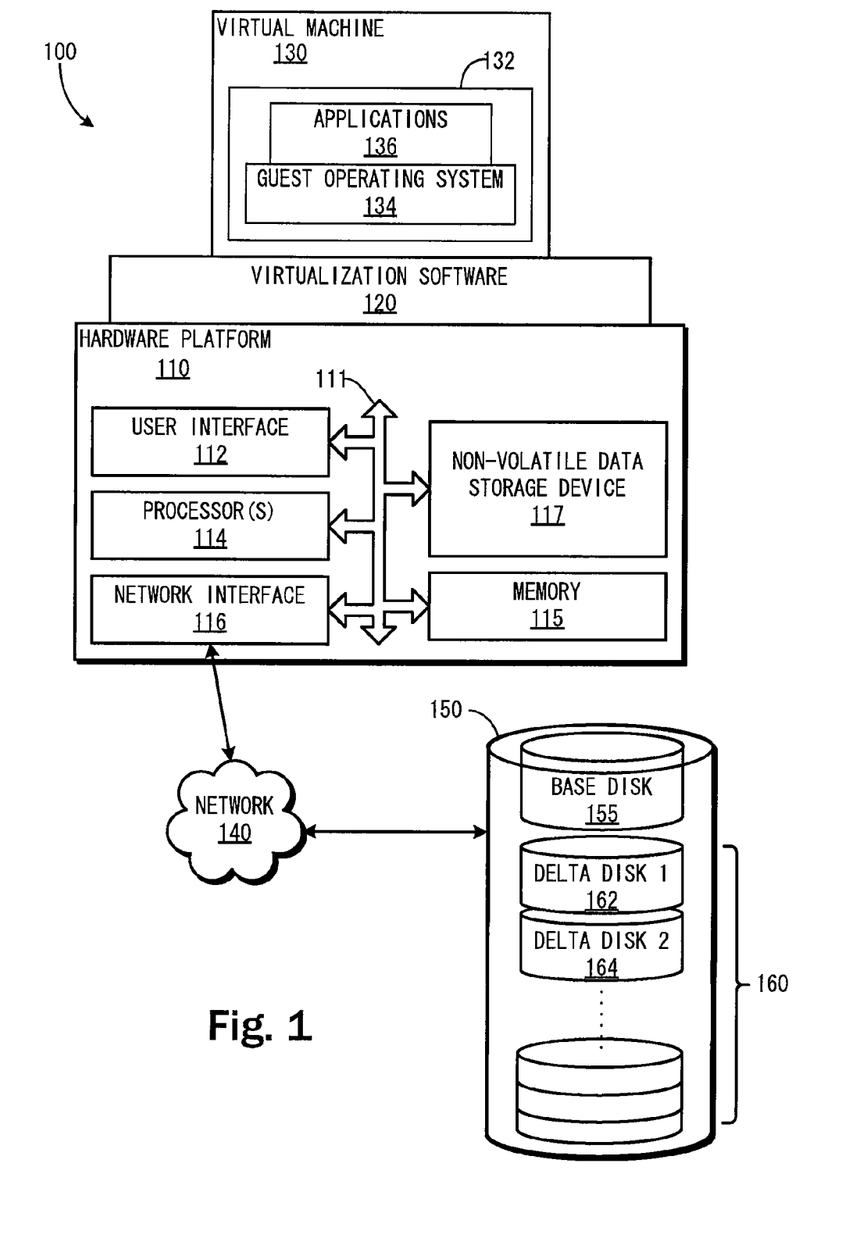
FIG. 1 shows a logical representation of an exemplary virtualized computer system.

FIG. 1 shows a logical representation of an exemplary virtualized computer system 100. Virtualized computer system 100 includes a physical hardware platform 110, virtualization software 120 running on hardware platform 110, and one or more virtual machines 130 running on hardware platform 110 by way of virtualization software 120. Virtualization software 120 is therefore logically interposed between the physical hardware of hardware platform 110 and guest system software 132 running "in" virtual machine 130.

Hardware platform 110 may be a general purpose computing system having one or more system buses 111 that place various hardware platform components in data communication with one another. For example, one or more processors 114 are placed in data communication with a memory 115 using system bus(es) 111. Memory 115 may comprise a system of memories including read only memory (ROM), random access memory (RAM), cache memories, and various register memories. Non-volatile data storage 117 may include one or more disk drives or other machine-readable media or mass data storage systems for storing software or data. Memory 115 and/or non-volatile data storage 117 may store virtualization software 120 and guest system software 132 running in virtual machine 1310. User interface 112 may be provided including a keyboard controller (not shown), a mouse controller (not shown), a video controller (not shown), and an audio controller (not shown), each of which may be connected to corresponding user devices (not shown). As is typical for server computer systems, virtualized computer system 100 may or may not include user interface devices or they may not be connected directly to hardware platform 110. Instead, a user interaction may be automated or occur remotely as generally known in the field of data center administration. Network interface 116 enables data communication over a network 140. For example, network interface 116 may facilitate communication using a network protocol, such as TCP/IP or Fibre Channel.

Virtualization software 120 is well known in the field of computer virtualization. Virtualization software 120 performs system resource management and virtual machine resource emulation. Virtual machine resource emulation may be performed by a virtual machine monitor (VMM) component (not shown). In typical implementations, each virtual machine 130 (only one shown) has a corresponding VMM instance. Depending on implementation, virtualization software 120 may be unhosted or hosted. Unhosted virtualization software generally relies on a specialized virtualization kernel for managing system resources, whereas hosted virtualization software relies on a commodity operating system—the "host operating system"—such as Windows, Mac OS X, or Linux to manage system resources. In a hosted virtualization system, the host operating system may be considered as part of virtualization software 120.

Virtual machine 130 conceptually comprises the state of virtual hardware devices (as emulated by virtualization software 120) and contents of guest system software 134. Hardware emulation is performed by virtualization software 120. As shown in FIG. 1, guest system software 132 includes a guest operating system 134 and guest applications 136. Guest operating system 134 may be a commodity operating system such as Windows or Linux. Virtualization software 120 is responsible for managing inputs and outputs to and from virtual machine 130.

Guest system software 132 is stored on a virtual disk, which may be maintained on non-volatile data storage device 117 or in datastore 150. The term, "datastore" is intended to be broadly interpreted to mean a container for data, and may be implemented as a container or storage volume for virtual machines formatted with a file system such as NFS or VMFS. In the present example, the virtual disk image is maintained in a base disk image file 155 and one or more delta disks 160 on external datastore 150. Delta disks 160 include at least one delta disk particular to VM 130 as well delta disks for other VMs (not shown).

Figure 2:
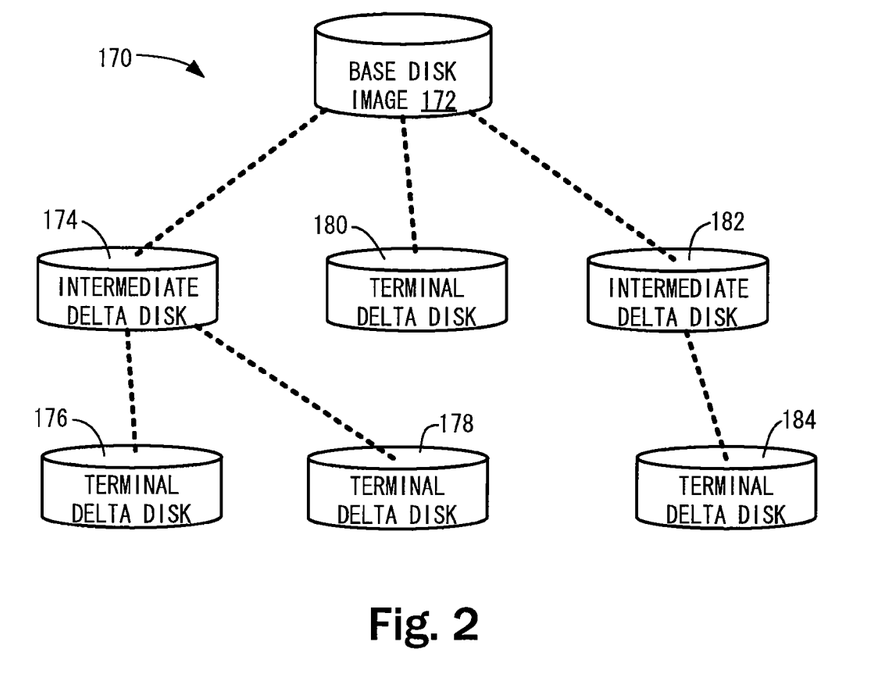
FIG. 2 shows a schematic diagram of an exemplary hierarchical disk structure.

FIG. 2 shows a schematic diagram of an exemplary hierarchical disk structure, which includes a base disk image 172 and a number of delta disks 174-184. Each of delta disk 174-184 and base disk image 172 is a disk image defined by one or more files stored on one or more datastores, such as datastore 150 shown in FIG. 1. Delta disks 176, 178, 180, and 184 are "terminal delta disks" in that they are the last in the chain of delta disks. Each delta corresponds to a virtual disk image. In another view, base disk image 172 includes content that may be common to a plurality of different disk images. Intermediate delta disks 174 and 182 contain changes to base disk image 172. Terminal delta disks 176, 178 contain changes to intermediate delta disk 174. Similarly, terminal delta disk 184 contains changes to intermediate delta disk 182. There may be any number of intermediate delta disks, including zero, for any terminal delta disk.

Each hierarchical disk component can be thought of as being a child component and/or a parent component in a chain. Each terminal delta disk 176, 178, 180, 184 is a child component since it depends on either an intermediate delta disk or a base disk image. Base disk image 172 is a parent when it has one or more delta disks depending on it. Each intermediate delta disk 174, 182 is a parent of either another intermediate delta disk or a terminal delta disk. Each intermediate delta disk 174, 182 is also a child of either the base disk image, or another intermediate delta disk.

By way of example, suppose base disk image 172 included an installation of an operating system such as Microsoft Windows and an office production suite, including a word processor, email client, spreadsheet, etc. Intermediate delta disks 174, 182 may include additional installed applications needed for users of a particular group in an organization, such as accountants or engineers. To create an intermediate delta disk, a delta disk such as delta 174 is created which initially appears to the computer as an exact copy of base disk image 172, since no changes were written to the delta disk. Then the virtual machine is launched using the delta disk image, essentially launching the operating system installed on base disk image 172. Then, the various departmental applications may be installed to the virtual disk formed by the hierarchical disk structure formed by the delta disk and base disk image. The virtual machine may then be powered down if needed. A snapshot of the VM is created, which then makes the delta an intermediate delta disk. Terminal deltas pointing to the just-created intermediate delta can then be created for a plurality of users. Each terminal delta may be individualized with configurations necessary for them to coexist on a network, e.g., unique machine numbers, MAC addresses, etc. which are managed using well-understood techniques, described for example, in U.S. Pat. No. 7,356,679, entitled "Computer Image Capture, Customization and Deployment," which issued on Apr. 8, 2008.

Modifying a base disk image or intermediate delta disk that has delta disks depending from them could corrupt the virtual disk images represented by the terminal delta disks. Referring to FIG. 2, if intermediate delta disk 182 were to be written to, it could corrupt the image provided by terminal delta disk 184, since terminal delta disk 184 represents changes to the image presented by intermediate delta disk 182 and these changes can be inconsistent with any changes made directly to intermediate delta disk 182. Therefore, intermediate delta disks and the base disk image are generally locked. In one embodiment, they are locked by tagging the file using a "read only" tag provided by the filing system, which thereafter prevents any application from writing to these files. If delta disk 184 were to be deleted, then the image can be reverted back to the state prior to the changes embodied in terminal delta disk 184 by simply referencing intermediate delta disk 182, which becomes a terminal delta disk (and read-only protection removed) since no additional delta disks depend from intermediate delta disk 182. Other protections for intermediate delta disks and base disk image files may be provided in addition to, or instead of file system "read-only" tagging. For example, a database may be used to track interrelations between components of a hierarchical disk, and software accessing these components can be written to ensure that base disk images and intermediate delta disks are never written to.

Figure 3:
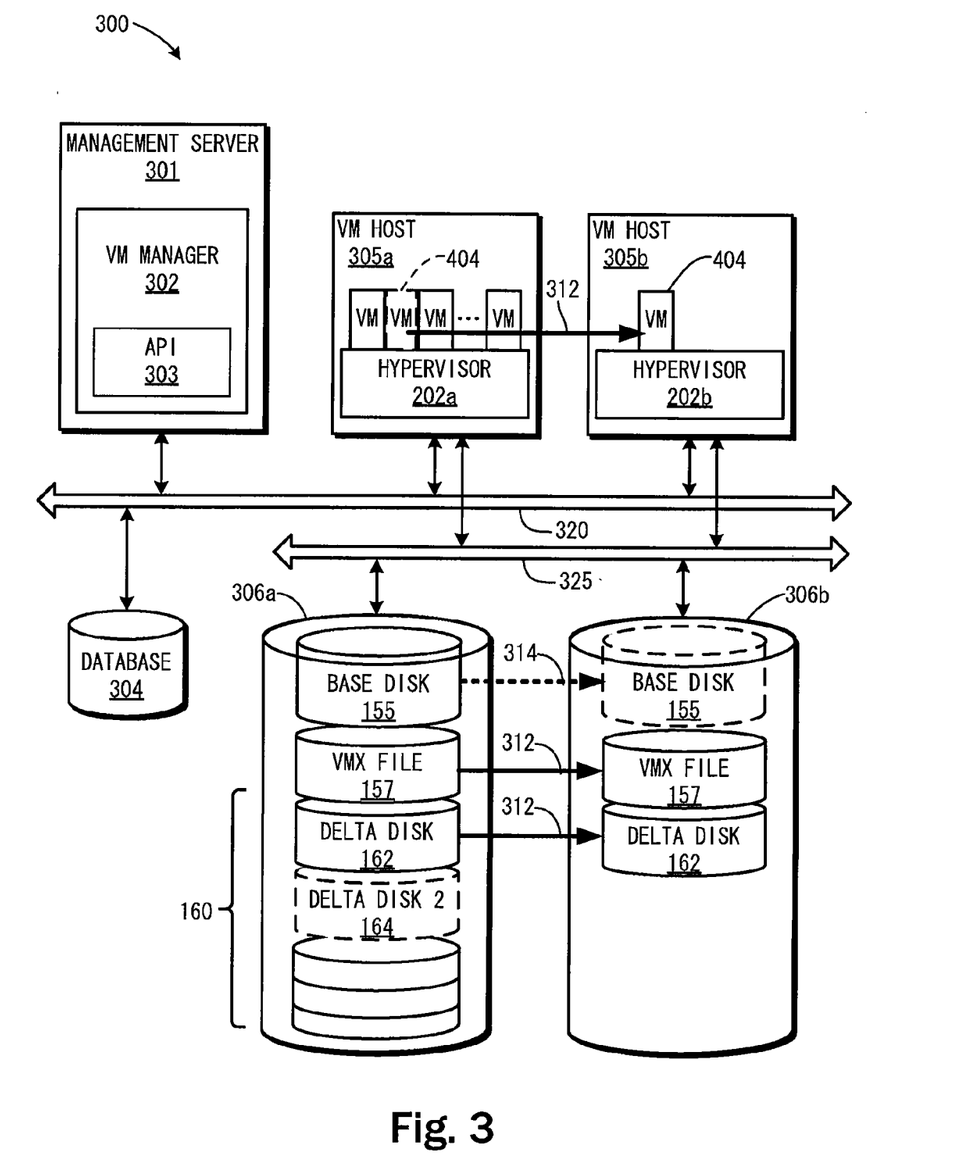
FIG. 3 shows a schematic diagram illustrating by way of example system for the management of virtual machines.

FIG. 3 is a schematic diagram illustrating by way of example system 300 for the management of virtual machines. As depicted in this figure, system 300 includes virtual machine (VM) manager 302 which is an application that executes on a management server 301. In one embodiment, VM manager 302 can be an implementation of vCenter, a product commercially available from VMware, Inc. VM hosts 305a, 305b may be a member of a common cluster of VM hosts that share a datastore, but plurality may also be in separate clusters or not in any cluster. In addition, VM manager 302 has access to a database 304, which might also run on the management server 301, or could run in a separate database server (not shown). Although shown as a physical computer system, it should be recognized that management server 301 can be implemented as a virtual machine that runs in one of VM hosts 305a, 305b, or an additional VM host (not shown).

Management server 301 is connected to VM hosts 305a, 305b, via network 320, which may be, for example, a network such as a LAN, WAN, Internet, or the like, or a combination of different networks. VM hosts 305a and 305b each execute a hypervisor 202a, 202b, respectively, which in turn each implement one or more VMs. In general, commands flow from the virtual machine manager 302 to the hypervisors 202a and 202b, and information flows from hypervisors 202a and 202b to virtual machine manager 302. API 303 provides an interface to access the functionality provided by VM manager 302. In one embodiment, API 303 is implemented as a web service receiving information or requests in XML format. By way of example, this type of interface is described in the *VMware VI 3.0 SDK Reference Manual* (Revision 20060906 Version 2.0.1 Item: SDK-ENG-Q306-291.

Hosts 305a and 305b are connected via network 325 to datastores 306a and 306b. Network 325 may be an Ethernet local area network (LAN), Fibre Channel network, or the like. In another embodiment (not shown) datastores 306a, 306b are connected to communications network 320 rather than a separate storage network. Datastores may be implemented as network attached storage (NAS) or as a storage area network or a combination thereof. Each datastore 306a, 306b may be a logical storage volume (backed by a physical device called "logical unit number" (LUN), a mount point like NFS or a physical disk available on the host) and may, as would be understood by those skilled in the art, include or reside on one or more physical storage devices connected to a management or control interface (not shown). Since they may be logical volumes, it is possible that datastores 306a, 306b are maintained on a common storage array or separate storage arrays. Also, although not shown in FIG. 3, there may be an intermediary storage controller or devices that act on behalf of the VM hosts connected to the network. Finally, it is possible that each datastore reside within a corresponding VM host and be connected using a standard ATA or SCSI connection.

Database 304 stores a content ID for each component of one or more hierarchical disk structures such as that shown in FIG. 2. Database 304 may additionally store other data, e.g., configurations, settings, and status related to VM hosts 305a, 305b. Database 304 may, e.g., be a relational database, an object-oriented database, an object-relational database, etc.

In an alternative embodiment, a content ID may be stored in a database associated with a host server such as 305a and 305b, in a distributed system of hypervisors. Such a distributed system of hypervisors may have a virtual machine manager 302, but one is not required. It will be appreciated that this alternative embodiment promote scalability and fault tolerance if redundant copies of a content ID were persistently stored, albeit at the time expense of additional communication regarding content IDs between the hypervisors themselves or between the hypervisors and the virtual machine manager, if present.

In one embodiment, each content ID is 128-bit number that is randomly generated, e.g., using a pseudorandom or random number generator. It is also possible to sequentially assign content IDs. In this respect, one might regard a content ID as somewhat similar to a Universally Unique Identifier (UUID) or a Globally Unique Identifier (GUID). However, in one embodiment, VM manager 302 assigns a content ID to a component (i.e., a delta disk or base disk image) in a virtual disk hierarchy when the hypervisor operating in conjunction with the virtual machine associated with the component performs a "file open" operation and an initial "file write" operation on the component. The content ID remains unchanged during additional "file write" operations by the virtual machine. However, if the virtual machine performs a "file close" operation on the component and then performs another "file open" and "file write" operation on the component, the system, e.g., VM manager 302, will assign a new content ID to the component.

Content ID collisions can occur if two components happen to be given the same content ID even though the contents are not identical. Such a collision, although extremely unlikely, could cause serious data corruption. One approach to prevent content ID collisions would be to monitor any content ID changes in the system and look for collisions. If the content ID of a given disk component is changed to a particular value, and another disk component in the system already has a content ID of that value, then you can conservatively assume that this is a collision, since it is very unlikely that a disk write caused the content to suddenly become the same as another disk component. In the case of a collision, a new content ID is assigned to the changed disk component. An alternate method can be used if deemed necessary for newly recognized disk images, i.e., disk images that have no content ID assigned. For example, file length comparison and contents of a disk block at a random file offset can be used to eliminate each other disk component as matching, in which case a new content ID would be assigned.

API 303 may be accessed remotely using a web service protocol such as SOAP. Messages may be sent and received using a script or program executing on a web service client machine (not shown). The client can cause the virtual machine manager 302 to issue a command to one of the hosts 305a or 405b, directing it to transfer (e.g., a copy operation or a copy operation and a delete operation) VM 404 from VM host 305a to VM host 305b, as illustrated. The hypervisor may be include programming to carry out this functionality, or another software component (not shown) within host 305a, 305b, may carry out the transfer. When VM 404 is moved from VM host 305a to VM host 305b, it may be necessary to move all the data files associated with the VM from datastore 306a to datastore 306b. For example, datastore 306a may be a disk volume controlled by hypervisor 202a and is only readily accessible by hypervisor 202a whereas datastore 306b is a volume that is controlled by and readily accessible by hypervisor 202b. Alternatively, sometimes it is necessary to move data files simply because the datastore is reaching its capacity, due to natural growth of delta disks as changes are written to the virtual disk they represent.

For purposes of illustration, suppose VM 404 accesses a virtual disk image implemented by a disk hierarchy including base disk 155 and delta disk 162. In an embodiment where the hypervisor is provided by VMware Inc., both the base disk image 155 and delta disk 162 might be a VMDK file, i.e., contents of a virtual machine's hard disk drive may be encapsulated using the VMDK file format. Also, VM 404 itself may be embodied in VMX file 157. VMX files are data files for storing the configuration settings for VMs. Thus, VMX file 157 may be transferred to target data store 360b along with the virtual disk image associated with VM 404. Additional files associated with the migrating VM may also be transferred.

Arrows 312 represent transfer of VM 404 from source VM host 305a to target VM host 305b and delta disk 162 from source datastore 306a to target datastore 306b. Since delta disk 162 relies on base disk 155, a copy of base disk 155 needs to be present on target datastore 306b as well.

In one embodiment, on receiving a request via API 303 to move a particular VM 404 from VM host 305a to VM host 305b, VM manager 302 issues a query to database 304 to identify the components of disk hierarchy associated with the specified VM. VM Manager then checks to see which components, if any, are already present on target datastore 306b, which contains files for VMs on VM host 305b.

The check is performed by accessing the content ID of hierarchical disk components present on datastore 306b, and comparing the content ID of base disk image 155 with those disk components already on datastore 306b. If datastore 306b includes base disk image 155 having a content ID that matches the value of the content ID base disk image 155 on datastore 306a, an extremely strong inference arises that the two base disk images have the same contents. In this case, VM manager 302 does not copy the base disk image 155 from datastore 306, but merely associates delta disk 162 on target datastore 306b with the base disk image 155 on target datastore 306b. By "associate," is meant that the newly associated base disk image on the target datastore would then be referenced for disk reads when the information sought is not present in the delta disk. The reference may be written to a field within or property of the delta disk itself or it may be maintained separately. On the other hand, if base disk image 155 is not present on datastore 306b, i.e., there are no disk component on datastore 306b having a matching content ID, then base disk image 155 is copied from datastore 306a to datastore 306b, as shown by broken arrow 314.

The transfer of files as described above may be carried out on behalf of VM manager 302. For example, VM manager 302 may command the hypervisor 202a or 202b to copy only delta disk 162 to datastore 306b and then associate copied delta disk 162 on datastore 306b with the copy of base disk image 155 already on datastore 306b. In an alternative embodiment, VM manager 302 may be in communication with datastores 306a, 306b, and perform the move and/or association directly rather than so commanding one of the VM hosts.

In one embodiment, the VM being transferred might be in a "powered off" or "suspended" state, such that the virtual machine is not currently executing or in a scheduling queue. In another embodiment, the VM may be executing during migration of the disk, e.g., as described in United States Patent Application Publication 2009/0037680, which published Feb. 5, 2009. In another embodiment, the virtual machine may be migrated "live," i.e., without significant interruption of the operation of the VM along with disk migration. Live migration of a VM is described in U.S. Pat. No. 7,484,208, which issued Jan. 27, 2009. Live migration might be performed when VM manager 302 engages in dynamic load balancing of virtual machines or some other form of distributed resource management.

Two virtual machines are referred to as "linked clones" when they share a common base disk image or intermediate delta disk. Some hypervisors support linked clones. It will be appreciated that a linked clone includes a specific type of virtual disk hierarchy, e.g., a virtual disk hierarchy with at least one virtual delta disks associated with a virtual base disk. A linked clone might be created by a disk snapshot, and facilitate the rapid deployment of the same guest system software in a multitude of virtual machines.

Figure 4A:
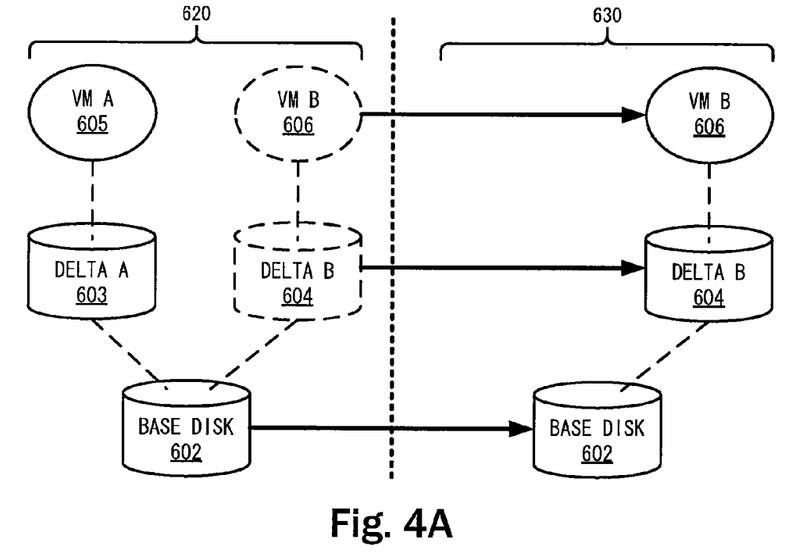
FIGS. 4A and 4B show schematic diagrams illustrating the transfer of linked clones across datastores.
Figure 4B:
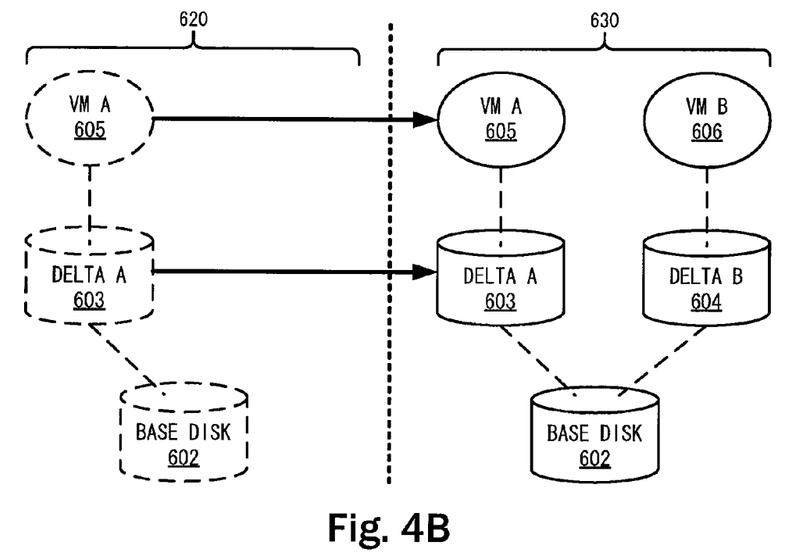

FIGS. 4A and 4B are schematic diagrams illustrating by way of example the transfer of linked clones across datastores. As depicted in FIG. 4A, a pair of linked clones includes two virtual machines, VM A 605 and VM B 606, each of which is associated with the same virtual base disk 602 through corresponding virtual delta disks 603, 604, respectively. In one embodiment, for each copy of each component, a count (not shown) is maintained, e.g., in database 304 (FIG. 3) that identifies the number of delta components that depend from the component. Base disk 602 has two delta components, delta A 603 and delta B 604, so its reference count would be two. When additional delta disks are created from base disk 602, the count is incremented.

At some point in time, a VM manager (not shown) receives a request to transfer VM B 606 from source datastore 620 to target datastore 630. It will be appreciated that this transfer involves, among other things, copying the virtual base disk 602 with content ID X to target datastore 630, as well as the delta disk 604. The reference count for base disk 602 on target datastore 630 is initialized at one, since newly copied delta B 604 depends on base disk 602. As indicated by dashed outlines, VM B, i.e., the file or files containing configuration and state information, such as the VMX file described above, and delta B 604 may be deleted from source datastore 620 after the virtual machine's transfer to target datastore 630. When delta B 604 is deleted, the reference count for base disk 602 on source datastore 620 is decremented from two to one, indicating that only one delta disk (delta A 603) depends from base disk 602 on source datastore 620. The reference count may be referenced to identify whether delta disks depend on base disk image 602. If the reference count is zero, then no delta disks depend from base disk image 602, it may be deleted from source datastore 620. In the present example, base disk image 602 is not deleted from source datastore 620, since at this time the reference count is equal to a number that is greater than zero, i.e., one. VM A 605 still resides in source datastore 620 and relies on the presence of a copy of base disk image 602 in source datastore 620. When delta B 604 and base disk 602 are copied from source datastore 620 to target datastore 630, they each retain their respective content ID such that both copies of base disk 602 have the same content ID.

At a later point in time, the system transfers VM A 605 and its delta disk 603 to target datastore 630 as shown in FIG. 4B. A check of content IDs of components present in target datastore 630 reveals that a copy of base disk image 602 is already present on target datastore 630. Therefore, the system does not create a second copy of that virtual base disk, saving both copying time and storage space on target datastore 630. To complete the transfer of the linked clones, the system associates (or "reparents") delta disk 603 on target datastore 630 with the base disk image 602 already present on target datastore 630, thereby re-creating the linked clones on target datastore 630. When delta A 603 is parented to base disk 602, the reference count for the copy of base disk 602 on target datastore 630 is incremented from one to two. At this time the disk hierarchy originally present on source datastore 620 has been recreated on target datastore 630.

Having copied VM A 605 and delta disk A 603 to target datastore 630, and having recognized the presence of a copy of base disk image 602 on target datastore 630, each component may be deleted from source datastore 620, as indicated by the broken outlines of these components in FIG. 4B. When delta A 603 is deleted from source datastore 620, the reference count for base disk 602 is decremented from one to zero, indicating there are no longer any delta disks depending on base disk 602. When base disk 602 is copied to target datastore 620, a check of the reference count for source datastore 620 reveals that base disk 602 may be deleted from source datastore 620 since the reference count is now zero, indicating no delta disks remain on source datastore 620 that depend on base disk 602. Note that deletion of hierarchical disk components from source datastore 620 is optional. For example, the copy operation may be performed for data redundancy, i.e., as a "backup" operation, in which case maintaining original copies of the components on source datastore 620 would be desirable.

Figure 5:
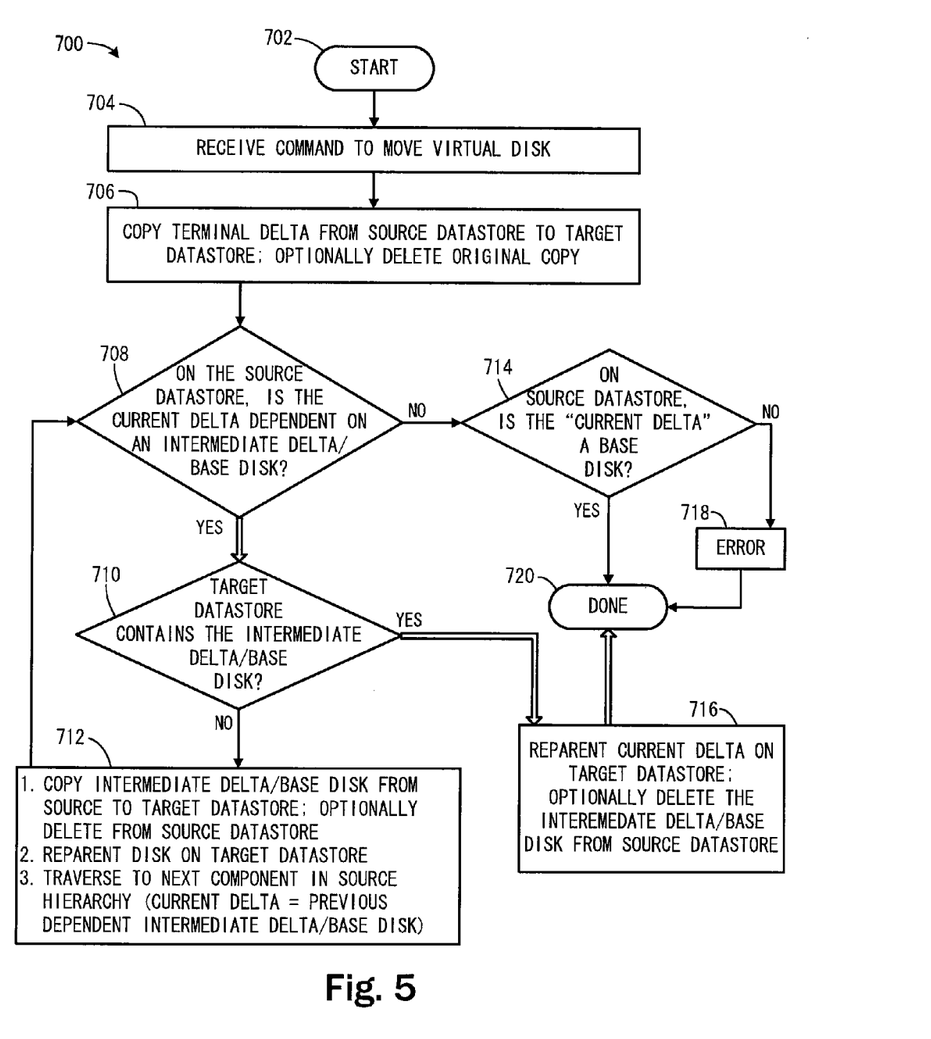
FIG. 5 shows a flowchart illustrating by way of example a procedure for transferring a virtual disk hierarchy across datastores, in accordance with an example embodiment.

FIG. 5 shows a flowchart 700 illustrating by way of example a procedure for transferring a virtual disk hierarchy across datastores. The procedure begins as indicated by start block 702 and flows to operation 704, wherein a VM manager receives a request (e.g., through an API call to a virtual machine manager) to move a virtual disk hierarchy from a source datastore to a target datastore. In one embodiment, the request may include one or more calls to the API, where the one or more calls request a copying of a virtual machine and a virtual disk hierarchy from the source datastore to the target datastore and the one or more calls further indicate that a sharing of a non-writable component of the virtual disk hierarchy is allowable. In response to the request, the procedure flows to operation 706, wherein the terminal delta disk is copied from the source datastore to the target datastore and the terminal delta on the source datastore is optionally deleted.

In operation 708, the system then enters a loop and determines whether the current virtual delta disk (e.g., the virtual delta disk that was copied to the target datastore and deleted from the source datastore) is dependent on an intermediate delta disk or base disk on the source datastore. If the determination in operation 708 is negative, the system exits the loop and proceeds to operation 714. If the determination in operation 708 is positive, the system proceeds with operation 710 wherein it is determined whether the target datastore contains a copy of the intermediate delta disk or base disk on which the current delta disk depends. As described above with reference to FIG. 3, this determination involves comparing a content ID of the dependent disk with hierarchical disk components already present on the target datastore. If there is no match, then the determination in operation 710 is negative, and the system proceeds to operation 712.

In operation 712, the intermediate delta disk or base disk on which the current delta disk depends is copied to the target datastore, and the current delta is reparented to the just copied intermediate delta or base disk. By "reparented," it is meant that current delta becomes the child of the just-copied intermediate delta or base disk. If the intermediate delta/base disk on the source datastore no longer has any dependent deltas, then it may be deleted from the source datastore. The procedure then traverses to the next component in the source hierarchy, such that the previous dependent intermediate delta/base disk becomes the new "current delta." The procedure then loops back to operation 708 which continues as previously described.

In operation 710, if the target datastore does contain a copy of the intermediate delta/base disk, then the procedure flows to operation 716, wherein the copied current delta on the target datastore is reparented to the copy of the intermediate delta/base disk already present on the target datastore. The source datastore (or database) may be checked to determine whether the copy of the intermediate delta/base disk on the source datastore has any dependent delta disks. If not, then the copy of the intermediate delta/base disk on the source datastore may optionally be deleted. The procedure then ends as indicated by done block 720.

Returning to operation 708, if the current delta is not dependent on an intermediate delta/base disk, then the current delta is by definition actually a base disk, and the procedure flows to operation 714.

Operation 714 may be implemented as a check against error. If the "current delta," which should actually be a base disk, is identified in the database or elsewhere as a delta disk, then the procedure flows to operation 718 wherein an error is generated and the procedure ends. However, if the base disk is not identified as a terminal delta, then the procedure flows to done block 720 and the procedure is complete.

The path in flowchart 700 leading through operations 708, 710, and 716, then done block 720, is highlighted in FIG. 5. This highlighted path shows that when a content ID match is found, the just-copied delta is reparented to the matched file and the procedure is completed. No other ancestors need to be copied, irrespective of how many levels of components are left in the hierarchy. This is very useful as finding the match for the first parent itself means that only the terminal delta needs to be copied. Thus, the relocation happens very fast compared to prior methods of disk migration. In addition to faster completion time, the above-described procedure reduces the amount of data to be copied when VMs are sharing base disks and significantly reduces storage requirements on the target datastore. It will be appreciated that the deletion operation mentioned above with reference to operations 706, 712, and 716 are optional, insofar as there might be circumstances where a system administrator might want to create multiple versions of the same virtual disk hierarchy, e.g., for purposes of redundancy (i.e., backups), fault tolerance, etc.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. In this regard, it will be appreciated that there are many other possible orderings of the operations in the processes described above and many possible modularizations of those orderings. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

What is claimed is:

1. A software encoded in one or more non-transitory storage media for execution by a processor and when executed is operable to:
   receive one or more calls to an application programming interface, wherein the one or more calls request a copying of a virtual machine and a virtual disk hierarchy from a source datastore to a target datastore and wherein the one or more calls indicate that a sharing of a non-writable component of the virtual disk hierarchy is allowable;
   copy a child component of the virtual disk hierarchy to the target datastore without copying the parent component of the virtual disk hierarchy if a copy of the parent component is already present on the target datastore, as determined by matching a content identifier for the parent component with a content identifier for a component stored on the target datastore; and
   associate the copied child component of the virtual disk hierarchy with the copy of the parent component,
   wherein, in the source datastore and in the target datastore, virtual disks associated with one or more virtual machines are maintained in virtual disk hierarchies, each virtual disk hierarchy including, as components of the virtual disk hierarchy, a base disk and one or more delta disks which contain changes to the base disk and which are particular to respective virtual machines associated with the virtual disk, and each component of each virtual disk hierarchy having a corresponding content identifier that is updated in response to contents of the component being modified as a result of one or more write operations to the component.

2. The software of claim 1, wherein a new content identifier is assigned to each of the components on the target datastore each time a file open and file write is performed on the component.

3. The software of claim 2, wherein the new content identifier is randomly generated.

4. The software of claim 1, wherein the software when executed is further operable to:
   delete the child component on the source datastore;
   determine whether there is an additional child component present on the source datastore that is dependent on the parent component; and
   delete the parent component from the source datastore when there is no additional child component present on the source datastore that is dependent on the parent component.

5. The software of claim 4, wherein the determining as to whether there is an additional child component present on the source datastore that is dependent on the parent component comprises checking a reference count associated with the parent component on the source datastore.

6. The software of claim 1, wherein the software when executed is further operable to:
   if the copy of the parent component is not already present on the target datastore, copy the parent component from the source datastore to the target datastore and associate the copied child component with the copied parent component so that the copied parent component becomes the parent component to the copied child component at the target datastore.

7. A method for recreating a virtual disk hierarchy that is present on a source datastore on a target datastore, the method comprising:
   receiving one or more calls to an application programming interface, wherein the one or more calls request a copying of a virtual machine and the virtual disk hierarchy from the source datastore to the target datastore and wherein the one or more calls indicate that a sharing of a non-writable component of the virtual disk hierarchy is allowable;
   copying a child component of the virtual disk hierarchy to the target datastore without copying the parent component of the virtual disk hierarchy if a copy of the parent component is already present on the target datastore, as determined by matching a content identifier for the parent component with a content identifier for a component stored on the target datastore; and
   associating the copied child component of the virtual disk hierarchy with the copy of the parent component,
   wherein, in the source datastore and in the target datastore, virtual disks associated with one or more virtual machines are maintained in virtual disk hierarchies, each virtual disk hierarchy including, as components, a base disk and one or more delta disks which contain changes to the base disk and which are particular to respective virtual machines associated with the virtual disk, and each component of each virtual disk hierarchy having a corresponding content identifier that is updated in response to contents of the component being modified as a result of one or more write operations to the component.

8. The method of claim 7, wherein a new content identifier is assigned to each of the components on the target datastore each time a file open and file write is performed on the component.

9. The method of claim 8, wherein the new content identifier is randomly generated.

10. The method of claim 7, the method further comprising:
    deleting the child component on the source datastore;
    determining whether there is an additional child component present on the source datastore that is dependent on the parent component; and
    deleting the parent component from the source datastore when there is no additional child component present on the source datastore that is dependent on the parent component.

11. The method of claim 10, wherein the determining as to whether there is an additional child component present on the source datastore that is dependent on the parent component comprises checking a reference count associated with the parent component on the source datastore.

12. The method of claim 7, the method further comprising:
    if the copy of the parent component is not already present on the target datastore, copying the parent component from the source datastore to the target datastore and associating the copied child component with the copied parent component so that the copied parent component becomes the parent component to the copied child component at the target datastore.

13. A system comprising:
    a source datastore including or residing on one or more physical storage devices;

a target datastore including or residing on one or more physical storage devices; and one or more computers in which virtual machines are executed, each computer comprising:

a processor, and a memory, wherein the memory includes a program configured to perform operations comprising:

receiving one or more calls to an application programming interface, wherein the one or more calls request a copying of a virtual machine and a virtual disk hierarchy from the source datastore to the target datastore and wherein the one or more calls indicate that a sharing of a non-writable component of the virtual disk hierarchy is allowable, copying a child component of the virtual disk hierarchy to the target datastore without copying the parent component of the virtual disk hierarchy if a copy of the parent component is already present on the target datastore, as determined by matching a content identifier for the parent component with a content identifier for a component stored on the target datastore, and associating the copied child component of the virtual disk hierarchy with the copy of the parent component, wherein, in the source datastore and in the target datastore, virtual disks associated with one or more virtual machines are maintained in virtual disk hierarchies, each virtual disk hierarchy including, as components, a base disk and one or more delta disks which contain changes to the base disk and which are particular to respective virtual machines associated with the virtual disk, and each component of each virtual disk hierarchy having a corresponding content identifier that is updated in response to contents of the component being modified as a result of one or more write operations to the component.

14. The system of claim 13, wherein a new content identifier is assigned to each of the components on the target datastore each time a file open and file write is performed on the component.

15. The system of claim 13, the operations further comprising:

deleting the child component on the source datastore;

determining whether there is an additional child component present on the source datastore that is dependent on the parent component; and deleting the parent component from the source datastore when there is no additional child component present on the source datastore that is dependent on the parent component.

* * * * *